US008893899B1

(12) United States Patent
Hund

(10) Patent No.: US 8,893,899 B1
(45) Date of Patent: Nov. 25, 2014

(54) BICYCLE STORAGE AND DISPLAY SYSTEM

(76) Inventor: Thomas Frederick Hund, Redwood City, CA (US)

(*) Notice: Subject to any disclaimer, the term of this patent is extended or adjusted under 35 U.S.C. 154(b) by 38 days.

(21) Appl. No.: 13/507,978

(22) Filed: Aug. 9, 2012

(51) Int. Cl.
| | | |
|---|---|---|
| *A47F 7/00* | (2006.01) | |
| *A47F 5/08* | (2006.01) | |
| *B62H 3/12* | (2006.01) | |
| *B60R 9/10* | (2006.01) | |
| *A47F 10/04* | (2006.01) | |

(52) U.S. Cl.
CPC .............. *B62H 3/12* (2013.01); *A47F 5/0892* (2013.01); *B60R 9/10* (2013.01); *A47F 10/04* (2013.01)
USPC .............................. 211/17; 211/85.7; 211/117

(58) Field of Classification Search
CPC .............. B62H 3/12; B62H 3/00; B62H 3/02; B62H 3/04; B62H 3/08; B62H 3/10; B60R 9/10; A47F 10/04; A47F 5/0892; F16M 13/02; F16M 13/00; D06F 57/125; D06F 57/12; A47G 25/1442; A47G 25/0692; A47G 7/047; A47G 25/32; A47G 33/1246; B66C 1/12; E04B 9/18; E04B 9/20; F21V 21/02; F21V 21/38; F21V 21/16; F16L 3/14; A63G 9/12; F16B 45/00
USPC .............. 211/85.7, 17, 18, 19, 117, 118, 123, 211/124, 89.01, 85.29, 113, 209, 207, 175; 248/325, 317, 320, 328, 331, 339, 340, 248/343, 322, 327
See application file for complete search history.

(56) References Cited

U.S. PATENT DOCUMENTS

| | | | | |
|---|---|---|---|---|
| 610,656 | A | * | 9/1898 | Martin ............................ 211/18 |
| 3,782,559 | A | * | 1/1974 | Wright ............................ 211/17 |
| 3,872,972 | A | * | 3/1975 | Cummins et al. ............... 211/17 |
| 3,924,751 | A | * | 12/1975 | Ballenger ........................ 211/17 |
| 4,521,302 | A | * | 6/1985 | Stone ............................. 209/441 |
| 4,700,845 | A | * | 10/1987 | Fretter ............................ 211/18 |
| 4,749,089 | A | | 6/1988 | Stewart, III |
| 4,821,890 | A | | 4/1989 | Hills |
| 4,840,278 | A | | 6/1989 | Gelinas |
| 4,997,116 | A | * | 3/1991 | Grim ............................ 224/493 |

(Continued)

*Primary Examiner* — Jennifer E Novosad

(57) ABSTRACT

A bicycle storage system for prominently displaying the features of a bicycle, the system including two or more ceiling-mounted swag hooks, disposed to detachably hold a load transfer bar, the load transfer bar being capable of holding two or more cable loops, which can be attached or detached, and which can descend vertically and hold a cradle in multiple locations. One or more of the cable loops can include a turnbuckle or other length-adjustor, so that the relative lengths of the cables can be adjusted, so that a rake of a bicycle part can be adjusted with respect to level. Adjusting the rake of the bicycle part can have the effect of allowing the bicycle front wheel to use gravity to maintain it aligned with the rest of the bicycle.

A bicycle storage system for prominently displaying the features of a bicycle, the system including two or more ceiling-mounted swag hooks, disposed to detachably hold a load transfer bar, the load transfer bar being capable of holding two or more cable loops, which can be attached or detached, and which can descend vertically and hold a cradle in multiple locations. One or more of the cable loops can include a turnbuckle or other length-adjustor, so that the relative lengths of the cables can be adjusted, so that a rake of a bicycle part can be adjusted with respect to level. Adjusting the rake of the bicycle part can have the effect of allowing the bicycle front wheel to use gravity to maintain it aligned with the rest of the bicycle.

9 Claims, 3 Drawing Sheets

(56) References Cited

U.S. PATENT DOCUMENTS

| | | | |
|---|---|---|---|
| 5,074,419 A | 12/1991 | Smith | |
| 5,397,090 A * | 3/1995 | Carson et al. | 248/327 |
| 5,460,274 A * | 10/1995 | Kramer | 211/17 |
| 5,495,970 A * | 3/1996 | Pedrini | 224/314 |
| 5,664,687 A * | 9/1997 | Liatti | 211/17 |
| 5,779,068 A * | 7/1998 | Whiten et al. | 211/117 |
| 6,119,999 A * | 9/2000 | Fleishman | 248/489 |
| 6,161,702 A * | 12/2000 | Campbell | 211/17 |
| 6,196,511 B1 * | 3/2001 | Beauchemin | 248/328 |
| 6,237,781 B1 * | 5/2001 | Dahl | 211/17 |
| 6,935,600 B1 * | 8/2005 | Barrepski | 248/317 |
| 7,150,449 B1 * | 12/2006 | Dueck et al. | 254/278 |
| 7,631,854 B1 * | 12/2009 | Mountain | 254/390 |
| 7,641,356 B2 * | 1/2010 | Pieroth | 362/130 |
| 7,815,055 B2 | 10/2010 | Lang | |
| 8,047,492 B2 * | 11/2011 | Wang | 248/307 |
| 8,468,745 B2 * | 6/2013 | Krause | 49/199 |
| 2002/0134742 A1 * | 9/2002 | Huang | 211/17 |
| 2002/0195531 A1 * | 12/2002 | Walker | 248/228.4 |
| 2003/0164347 A1 * | 9/2003 | Bouvier, Jr. | 211/117 |
| 2004/0217239 A1 * | 11/2004 | Chuang | 248/125.8 |
| 2010/0237026 A1 | 9/2010 | Shaha | |
| 2010/0237213 A1 * | 9/2010 | Wang | 248/324 |

* cited by examiner

BICYCLE STORAGE AND DISPLAY SYSTEM

BACKGROUND

Prior Art

The following is a tabulation of some prior art that presently appears relevant:

U.S. Patents

| U.S. Pat. No. | Issue Date | Patentee |
| --- | --- | --- |
| 3,782,559 | Jan. 1, 1974 | Wright |
| 6,161,702 | Dec. 19, 2000 | Campbell |
| 5,664,687 | Nov. 09, 1997 | Liatti |
| 5,460,274 | Oct. 24, 1995 | Kramer |
| 4,821,890 | Apr. 18, 1989 | Hills |
| 4,749,089 | Jun. 07, 1988 | Stewart |
| 4,840,278 | Jun. 20, 1989 | Gelinas |
| 5,074,419 | Dec. 24, 1991 | Smith |
| 7,815,055 | Oct. 19, 2010 | Lang |

U.S. patent application Publications

| Publication Nr. | Publ. Date | Applicant |
| --- | --- | --- |
| 2010/0237026 | Sep. 23, 2010 | Shaha |

Nonpatent Literature Documents

Chou, Kimberly, *The Wall Street Journal*, "On the Right Rack" (Nov. 26, 2011)

Bicycle storage and display systems are used in domestic, retail, and exhibition settings. Many of these allow the bicycle to be elevated above the floor. There are three basic types of elevated bicycle storage systems: floor stands, wall-mounted, and ceiling mounted. All three types can be found employing arms or hooks upon which the bicycle's top tube or other parts of the bicycle rest, holding the bicycle in a vertical, horizontal, or upside down horizontal position. There is even a system for holding a bicycle horizontally such that all of the bicycle's frame and wheels are approximately equidistant from the ceiling (U.S. Pat. No. 5,460,274, Oct. 24, 1995, Kramer). A disadvantage of the wall mount systems is that the bicycle must be displayed at a set distance from a wall. A disadvantage of the ceiling mounting systems is that the bicycle must be displayed either at a set distance from the ceiling or employ a hoisting arrangement (U.S. Patent Application Publication Number 0237026 (Sep. 23, 2010, Shaha) and U.S. Pat. No. 6,161,702 (Dec. 19, 2000, Campbell). A disadvantage of the floor stand is that it does not free floor space. A disadvantage common to wall and ceiling mounting systems is that their precise placement is limited by the building's framework. To be securely mounted, the hanging system should be mounted to a stud or structural member of the building's framing, thus limiting where the bicycle may be displayed. Another disadvantage common to wall and ceiling mounting systems is that their removal requires tools and may leave large holes in the mounting surface. Another disadvantage of storage systems holding the bicycle's top tube is that the bicycle's handlebar and front wheel will often flop over to one side or another unless another device or method is employed to keep the front wheel on the same plane as the rear wheel.

Yet another disadvantage of these storage and display systems is their generally bulky and obtrusive appearance that tends to interfere with the viewer's enjoyment of observing the bicycle. This can be seen clearly in and U.S. Pat. No. 3,782,559 (Jan. 1, 1974, Wright) wherein a plate suspended from a ceiling holds the bicycle top tube. This invention also relies on weighing the bicycle prior to hanging it to insure the ceiling mounts are able to accommodate the load. In my invention, the bicycle top tube is held with a visually minimal cradle, and the load is transferred to the load bearing structure of the ceiling, eliminating the need to weigh the bicycle or otherwise contemplate whether the attachment to the ceiling is adequate. My invention also permits the rake of the bicycle top tube to be adjusted so that the bicycle's front wheel and steering assembly can assume and hold a straight-ahead orientation by virtue of its center of gravity while still holding the bicycle in as close to a horizontal position as possible.

SUMMARY OF THE INVENTION

In accordance with one embodiment two swag hooks, mounted in studs of a ceiling, hold between them a rigid load transferring bar which serves as a platform from which two cables are looped around and descend vertically to hold either end of a cradle which in turn holds the top tube of the bicycle. At least one of the two aforementioned cables has a turnbuckle or similar device incorporated into its length to allow the fine adjustment of length of the cable and thus can adjust the horizontal rake of the displayed bicycle after the system has been mounted, and a bicycle installed into the system. The cradle is a unitary rigid part and consists of two hooks, each with a means of securing the cables in their shanks, joined together by a rigid rod at the rear of their external curved sections so that the rigid rod is behind the bicycle top tube when viewed from the mounting side and when the bicycle is mounted.

ADVANTAGES

Accordingly, several advantages of one or more aspects are as follows: to provide a bicycle storage and display system that allows precise placement of the bicycle within a room without constraint arising from such factors as proximity to a wall, ceiling height, or location of structural studs or certain fixtures such as lights or HVAC ducts; to allow the load of the assembly and bicycle to be attached to load-bearing structures of the ceiling; to provide a precise means of post-installation adjustment of the bicycle's horizontal aspect, thereby allowing the front wheel of the bicycle to point straight ahead in relation to the rest of the bicycle without further apparatus; to be visually minimal; and to permit easy and routine mounting and dismounting of the bicycle. A further advantage is the storage and display system can be easily removed without tools.

DRAWINGS

Figures

DRAWINGS

Figure 1:
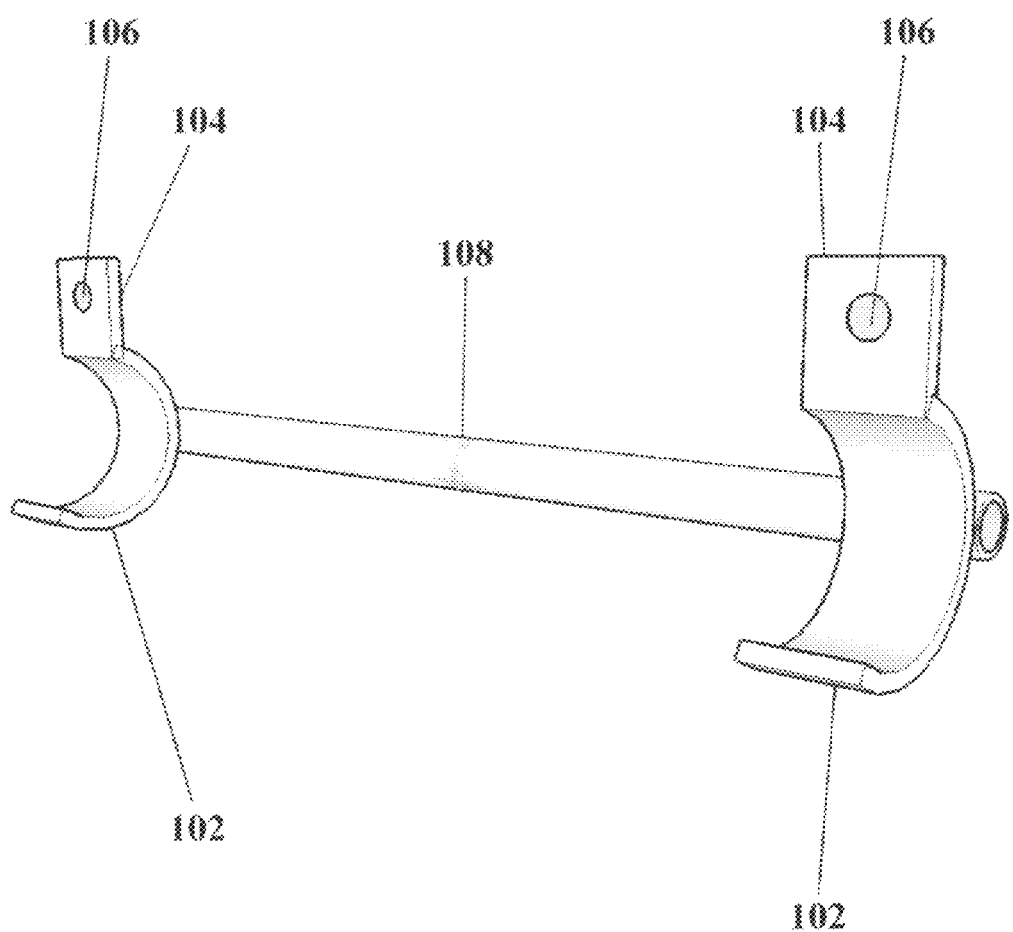
FIG. 1 shows a perspective view of the cradle assembly for docking of a top tube of the bicycle in accordance with one embodiment.

Reference Numerals 102 hook 104 shank
106 hole 108 rigid rod or tube
202 cable 206 rigid load transfer bar
208 turnbuckle 210 ceiling
212 swag hook 214 ceiling stud
216 cradle assembly 302 bicycle top tube

DETAILED DESCRIPTION

FIG. 1

The cradle is a unitary part designed to hold the top tube of the stored and displayed bicycle and attach to the remainder of the storage and display system. One embodiment of the cradle is illustrated in FIG. 1. This embodiment consists of two similar hooks (102), each with a gap length larger than the diameter of a bicycle top tube. The shank (104) of each hook ascends vertically with a hole (106), hook, or eyelet in the shank portion for attachments to the remainder of the system.

The two hooks (102) are joined in their rear external curved sections to a single rigid rod or tube (108) such that the hooks are parallel to each other and curved to a common diameter around a common axis.

I currently contemplate that the cradle be made of metal, but alternative embodiments of the cradle may be made of rigid plastic or composite materials, either made as a single part, or made of separate parts joined together by welding, or with adhesive or fasteners.

The lower load bearing internal faces of the hook portions of the cradle may have a layer of leather or rubber attached to them to reduce abrasion to the surface of the bicycle top tube.

FIG. 2

Figure 2:
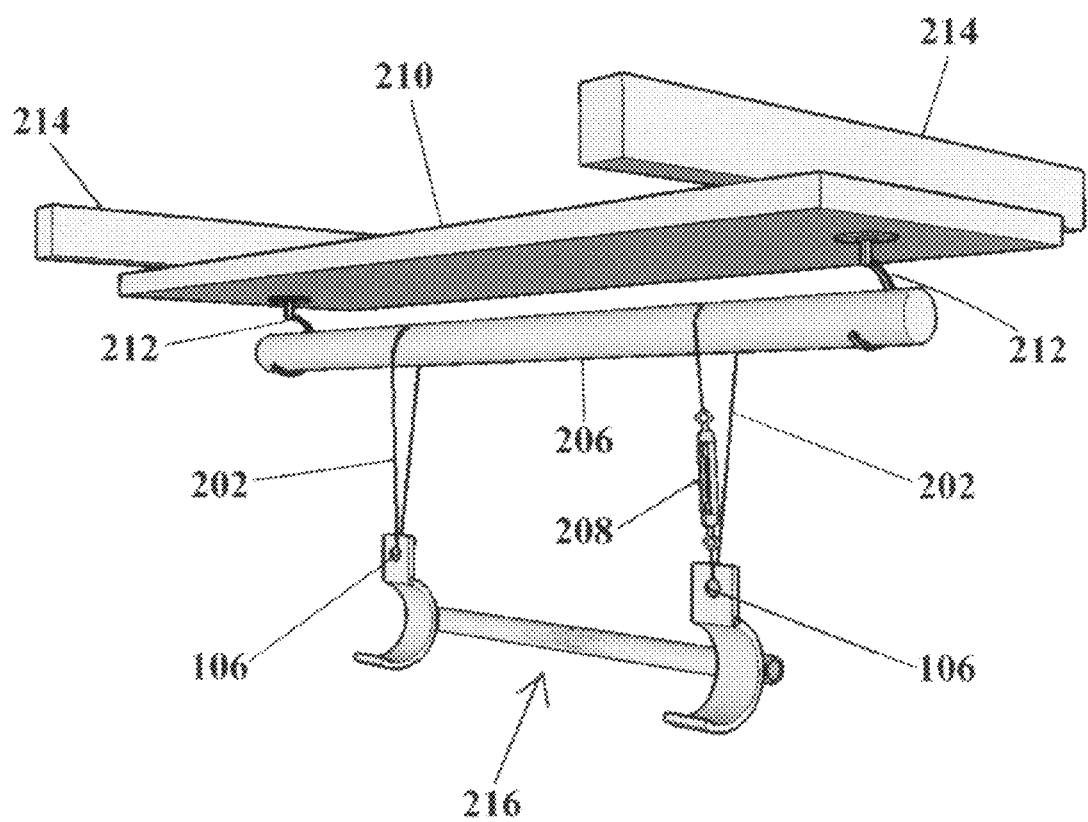
FIG. 2 shows a perspective view of the installed and assembled bicycle storage and display system in accordance with one embodiment.
Figure 3:
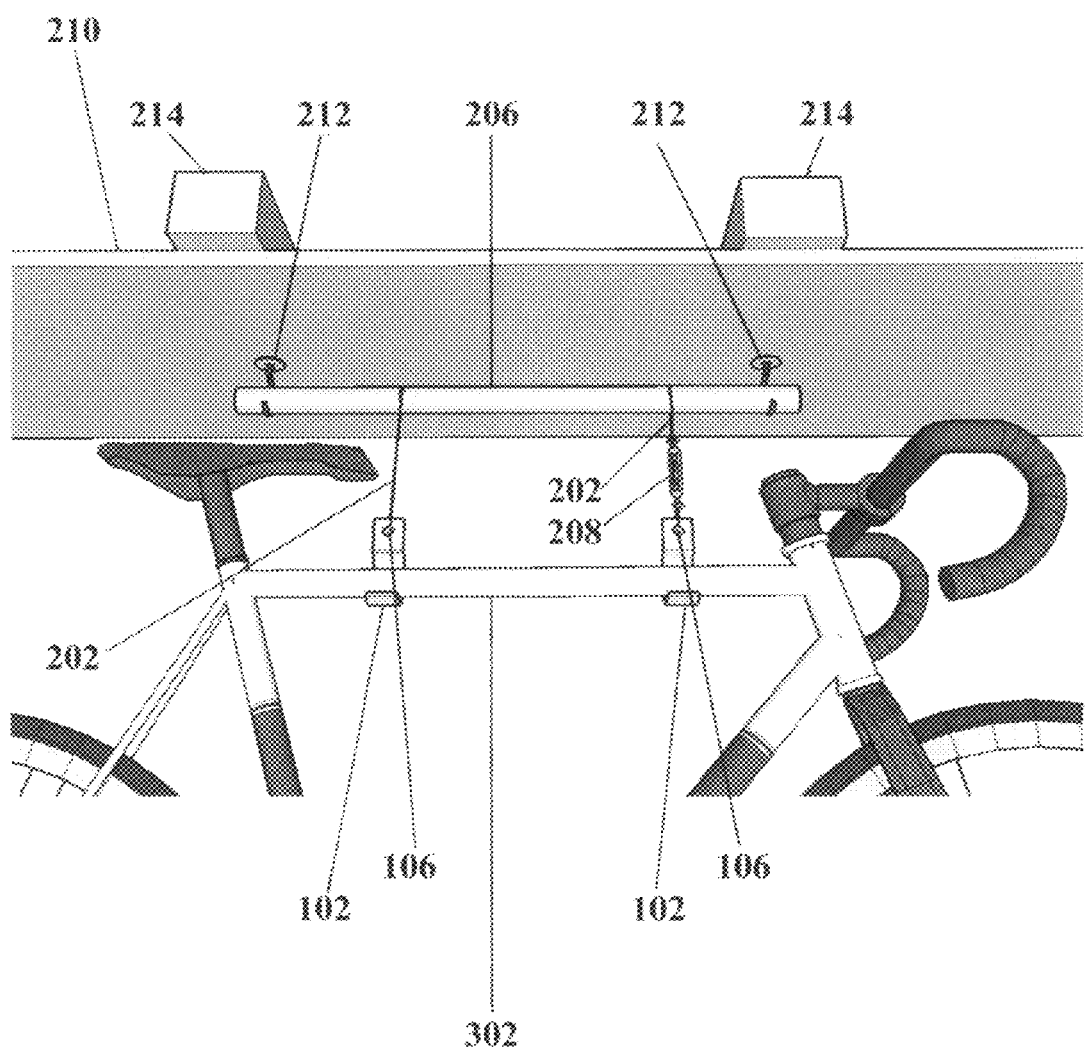
FIG. 3 shows a perspective view of the installed and assembled bicycle storage and display system in accordance with one embodiment storing and displaying the relevant portion of a bicycle.

One embodiment of the complete and assembled bicycle display and storage system is shown as a front view in FIG. 2. The cradle assembly (216) detailed in FIG. 1 is suspended by two cables (202), each cable routed through one of the holes (106), hooks, or eyelets in the cradle. The cable loops thus ascend vertically and in parallel so that their upper portions wrap around a rigid load transfer bar (206) and each cable forms a loop by securing its ends together with either a crimp or knot. At least one of the cable loops has a turnbuckle (208) included in its length. The rigid load transfer bar (206) is held in a plane parallel to the plane of the ceiling (210) by two swag hooks (212). The swag hooks (212) are mounted by screwing them into the studs or joists of the ceiling (214).

FIG. 3—Operation

The user decides where the bicycle will be stored and displayed. The user then locates the studs in the ceiling over and encompassing the desired location of the bicycle top tube (302). The user installs one embodiment of the storage and display system by first mounting the two swag hooks (212) into studs (214) of the ceiling (210). The user then cuts the cables (202) to the desired lengths, includes the turnbuckle (208) into the length of one of them, laces each through one of the holes in the cradle (106) and closes each of them into a loop with either a knot or a crimp. The user then inserts the rigid load transfer rod (206) through each of the loops formed by the cables (202) and places the rigid load transfer rod (206) into both swag hooks (212). The user slides the cables (202) over the rigid load transfer rod (206) to the desired position. The user then lifts the bicycle and places the bicycle top tube (302) into the hooks (102) of the cradle. If the front wheel of the bicycle tends to flop over to one side the user can lower the front of the bicycle by adjusting the turnbuckle until the point is reached where the front wheel points straight forward in relation to the remainder of the bicycle as a result of the relative placement of the center of gravity of the bicycle's steering assembly, including the front wheel. Removal of the bicycle is accomplished by lifting the bicycle's top tube up and away from the cradle. Subsequent replacement of the bicycle on the storage and display assembly is accomplished by lifting the bicycle onto the cradle, with no further adjustment of the assembly being required.

CONCLUSIONS, RAMIFICATIONS, AND SCOPE

This embodiment is a bicycle storage and display system, with its primary emphasis being ornamental display in a home, office, or retail establishment. One embodiment holds the bike in a generally horizontal position, natural for display, and the embodiment is designed to be visually minimal, even employing the bicycle top tube (302) to hide and minimize the visual aspect of the single rigid rod or tube (108) of the cradle. The turnbuckle and cable suspension arrangement permits the bicycle to be as close to horizontal as possible while still allowing the center of gravity of the bicycle's steering assembly to hold the front wheel straight ahead without intervention, which is the preferred display position. This takes advantage of the fact that when the bicycle is suspended in the cradle with the front wheel substantially lower than the rear wheel, the front wheel will self-straighten, while if the front wheel is higher than the rear wheel, or even exactly level on some bicycles, the front wheel will flop over to one side or the other. Different bicycles require different threshold rake angles to cause the front wheel to self-straighten. This embodiment permits the user to easily adjust for the rake position that is closest to horizontal while still allowing the front wheel to self-straighten.

Because placement is crucial in a display, this embodiment is designed to increase placement flexibility over previous designs. The bicycle can be mounted and displayed virtually anywhere in a room, at any height above the floor, without regard to ceiling height, stud or frame location, HVAC ducts, or even some light fixtures.

This embodiment was also designed to be practical. Because the cradle assembly is a unitary part, it moves as a single part when the bicycle top tube is placed against it during the mounting procedure, allowing for easy to mounting and dismounting of the bicycle because if one hook is positioned to accept the bicycle top tube, the other hook will always be so positioned as well. It can be used daily by a bicycle commuter in his office or home. Because it mounts to studs or framework, it is robust enough to survive bumps from careless people or investigation and pulling by children.

The entire embodiment can be removed without tools in minutes for occasions where neither the bicycle nor the storage and display system is desirable, and it can likewise be redeployed in minutes without tools after those occasions.

Although the description above contains many specificities, these should not be construed as limiting the scope of the embodiment but as merely providing an illustration for one embodiment thereof. Many other variations are possible. For example, FIG. 2 shows the cables (202) looped around the rigid load transfer bar (206). Many of the advantages of this bicycle storage and display system could be retained with the upper portions of the cables (202) attached to the lower portion of S-hooks while the upper portions of the S-hooks are positioned around the rigid load transfer bar (206). Alternative routing of the cables (202) is also possible, for example, routing the cable(s) through the holes (106) and through the tube of the rigid rod or tube (108).

For another example, the suspension improvements of rake adjustability and load transfer of this invention would still obtain with variations on the cradle (FIG. 1). Such variations could be a different attachment location of the rigid rod (108), a plurality of hooks (102), or even a continuous tube with a longitudinal section removed to hold the bicycle top tube.

This embodiment is illustrated with a bicycle, but would also be capable of holding for display certain sculptures or other forms of art and signage.

Thus the scope of the embodiment should be determined by the appended claims and their legal equivalents, rather than by the examples given.

What is claimed is:

1. A method of mounting and displaying a bicycle less than ninety degrees from a horizontal axis, said axis defining a substantially adjustable nonzero rake, said method including steps of
    mounting a load transfer object at two substantially immobile load-bearing points;
    suspending, including using suspension lengths coupled to said load-bearing points, at two points, a bicycle part from said load transfer object, at least one of said suspension lengths having a length-adjustor;
    manipulating the length-adjustor to provide a nonzero rake;
    whereby when the bicycle is mounted along the substantially horizontal axis with the substantially adjustable nonzero rake, a front wheel of the bicycle is maintained by a position of said bicycle substantially aligned in a plane with a rear wheel of the bicycle;
    wherein said steps of manipulating include steps of adjusting a length associated with one of said suspension lengths to provide the substantially horizontal axis with the nonzero rake;
    suspending two hooks from said load transfer object,
    each of said hooks including a shank portion, said shank portion being coupleable to an associated one of said suspension lengths,
    each of said hooks including a curved section, said curved section being coupleable to the bicycle;
    manipulating said curved sections associated with said two hooks, wherein said curved sections are coaxial;
    coupling said curved sections to a selected part of the bicycle, wherein said bicycle is maintained at the substantially horizontal axis.

2. A method as in claim 1, wherein
    said steps of mounting a load transfer object include steps of
    selecting said substantially immobile load-bearing points at two locations, a minimum pairwise distance between said locations not exceeding a maximum length of said load transfer object.

3. A method as in claim 1, wherein
    said curved sections are sufficiently tight to suspend the bicycle.

4. A method as in claim 1, wherein
    said curved sections are visually obscured by the bicycle when the bicycle has been mounted.

5. Apparatus for mounting and displaying a bicycle along a substantially horizontal axis, said axis defining a substantially adjustable nonzero rake, said apparatus including
    a load transfer object mountable at two substantially immobile load-bearing points;
    suspension lengths coupled to said load-bearing points, at two points, capable of suspending a bicycle part from said load transfer object, at least one of said suspension lengths having a length-adjustor;
    said length-adjustor being manipulable to provide a nonzero rake;
    whereby when the bicycle is mounted along the axis with the substantially adjustable nonzero rake, a front wheel of the bicycle is maintained by a position of said bicycle substantially aligned in a plane with a rear wheel of the bicycle;
    whereby when said length-adjustor is manipulated, length associated with one of said suspension lengths is adjusted to provide the axis with the horizontal rake;
    two hooks suspended from said load transfer object,
    each of said hooks including a shank portion, said shank portion being coupleable to an associated one of said suspension lengths,
    each of said hooks including a curved section, said curved section being coupleable to the bicycle;
    said curved sections associated with said two hooks being manipulable, wherein said curved sections are coaxial;
    said curved sections being coupleable to a selected part of the bicycle, wherein said bicycle is maintained at the substantially horizontal axis.

6. Apparatus as in claim 5, wherein
    said load transfer object includes
    substantially immobile load-bearing points at two locations, a minimum pairwise distance between said locations not exceeding a maximum length of said load transfer object.

7. Apparatus as in claim 5, wherein
    said curved sections are sufficiently tight to suspend the bicycle.

8. Apparatus as in claim 5, wherein
    said curved sections are substantially visually obscured by the bicycle when the bicycle has been mounted.

9. Apparatus for mounting and displaying a bicycle less than ninety degrees from a horizontal axis, said axis defining a substantially adjustable nonzero rake, said apparatus including
    two hooks, each have a coupling, each said coupling being mountable to a portion of a ceiling, each said coupling being capable of supporting the bicycle, each said hook including an element being open to coaxial placement of a load transfer element;
    said load transfer element being capable of being mounted on said two hooks using said element open to coaxial placement;
    said load transfer element being substantially surrounded by two height-adjustors, at least one of said height-adjustors including a length-adjustor;
    one or more shank portions coupled to each one of said height-adjustors, each shank portion being coupled to a holding apparatus, said holding apparatus being capable of supporting the bicycle;
    wherein the holding apparatuses are coupled at selected portions to a substantially straight bar, said bar holding apparatuses being coaxially aligned;

whereby when the bicycle is placed in the holding apparatuses, the bar is substantially visibly obscured by at least one portion of the bicycle;

whereby the length-adjustor is capable of being manipulated so as to adjust a rake of the bicycle; and whereby the rake of the bicycle, when adjusted, and when the bicycle is mounted on the holding apparatuses along the rake of the bicycle, a front wheel of the bicycle is maintained by a position of said bicycle substantially defined in a plane with a rear wheel of the bicycle.

\* \* \* \* \*